(12) United States Patent
Prix et al.

(10) Patent No.: US 11,999,226 B2
(45) Date of Patent: Jun. 4, 2024

(54) DRIVE SYSTEM FOR AN ELECTRIC VEHICLE AND METHOD FOR OPERATING THE DRIVE SYSTEM

(71) Applicant: Magna Powertrain GmbH & Co KG, Lannach (AT)

(72) Inventors: Daniel Prix, Graz (AT); Christian Milwisch, Lannach (AT); Dominik Schober, Graz (AT)

(73) Assignee: Magna Powertrain GmbH & Co KG, Lannach (AT)

( * ) Notice: Subject to any disclaimer, the term of this patent is extended or adjusted under 35 U.S.C. 154(b) by 244 days.

(21) Appl. No.: 17/580,744

(22) Filed: Jan. 21, 2022

(65) Prior Publication Data

US 2022/0234440 A1 Jul. 28, 2022

(30) Foreign Application Priority Data

Jan. 22, 2021 (DE) .......................... 102021200564.0
Feb. 2, 2021 (DE) .......................... 102021200941.7

(51) Int. Cl.
| | |
|---|---|
| *B60K 1/00* | (2006.01) |
| *B60K 17/02* | (2006.01) |
| *B60K 17/08* | (2006.01) |
| *F16D 21/02* | (2006.01) |
| *F16H 3/085* | (2006.01) |
| *F16H 3/091* | (2006.01) |
| *F16H 57/04* | (2010.01) |

(Continued)

(52) U.S. Cl.
CPC ................ *B60K 17/02* (2013.01); *B60K 1/00* (2013.01); *B60K 17/08* (2013.01); *F16D 21/02* (2013.01); *F16H 3/085* (2013.01); *F16H 3/091* (2013.01); *F16H 57/0441* (2013.01); *F16H 57/0473* (2013.01); *F16H 57/0476* (2013.01); *B60K 2001/001* (2013.01); *F16D 2121/18* (2013.01); *F16D 2125/36* (2013.01); *F16D 2300/06* (2013.01); *F16H 2200/0021* (2013.01); *F16H 2200/0034* (2013.01)

(58) Field of Classification Search
CPC .......... B60K 17/02; B60K 1/00; B60K 17/08; B60K 2001/001; F16H 3/085; F16H 57/0441; F16H 57/0473; F16H 57/0476
USPC ............................................. 74/665 GA, 335
See application file for complete search history.

(56) References Cited

U.S. PATENT DOCUMENTS 2,973,927 A * 3/1961 Miller .................. G05D 1/0077
  318/565
4,950,214 A * 8/1990 Botterill ................ F16H 48/295
  475/231

(Continued)

FOREIGN PATENT DOCUMENTS

DE 112014003872 T5 5/2016
DE 102007008946 B4 10/2018

(Continued)

*Primary Examiner* — Ha Dinh Ho
(74) *Attorney, Agent, or Firm* — Dickinson Wright PLLC

(57) ABSTRACT

A drive system with an electric machine and two gear stages, formed by gearwheels and clutches, the rotor shaft of the electric machine defining an axial overall length, within which the predominant axial length component of an intermediate shaft which runs parallel to the former with gearwheels and an oil pump and the predominant axial length component of a split output shaft which runs parallel to the other shafts with two clutches run.

13 Claims, 4 Drawing Sheets

Figure 1:
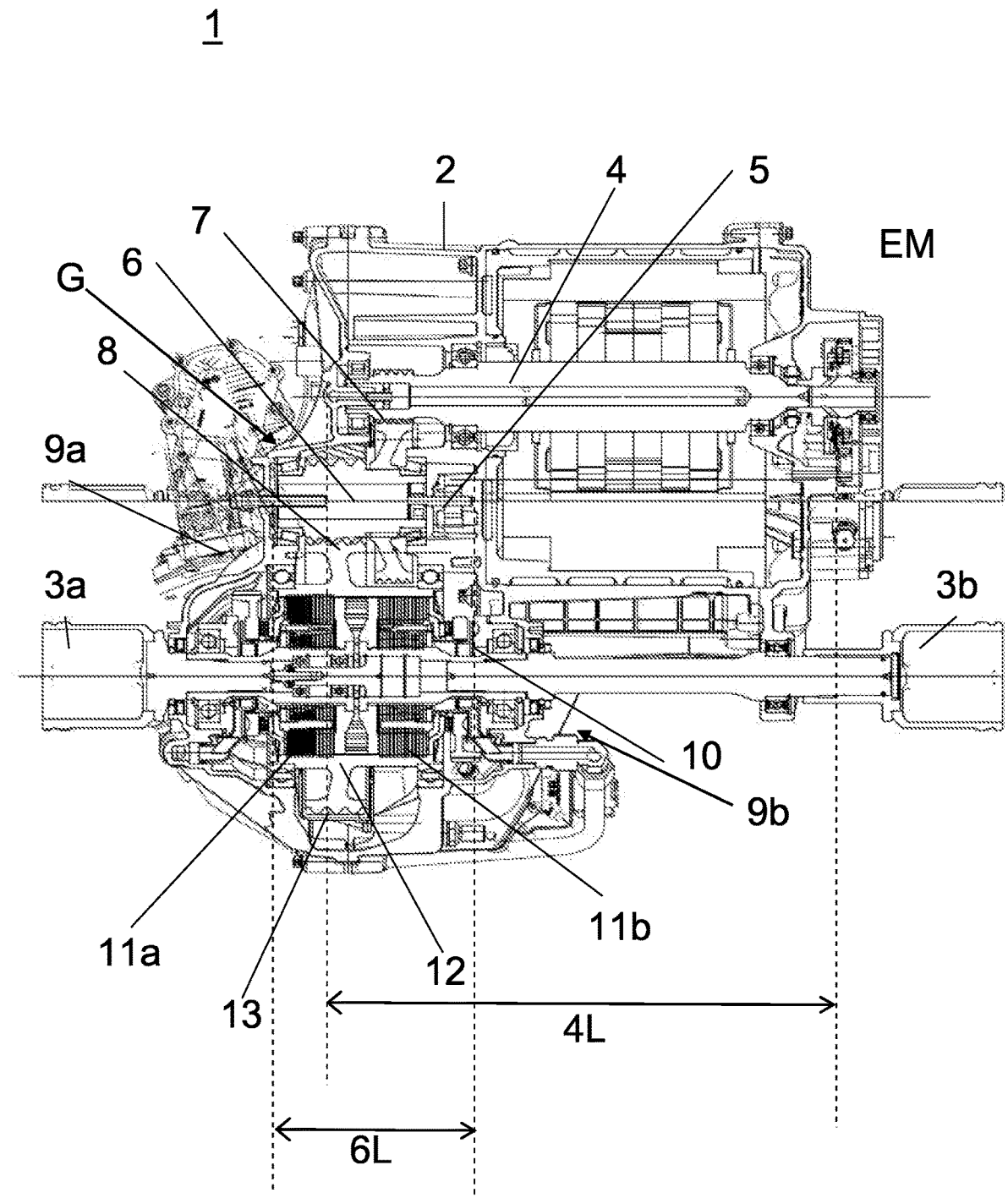

(51) Int. Cl.
    *F16D 121/18*     (2012.01)
    *F16D 125/36*     (2012.01)

(56)         References Cited

U.S. PATENT DOCUMENTS 7,584,832   B2 *  9/2009   Baasch .................. B60K 23/04
                                                          192/84.91
   10,493,978   B2 * 12/2019   Haupt ................... B60W 10/10
 2008/0314711   A1   12/2008   Jayaram et al.
 2009/0127954   A1 *  5/2009   Mogi .................. F16H 57/0476
                                                            310/90
 2018/0106353   A1 *  4/2018   Guarino ................ B60K 23/04

FOREIGN PATENT DOCUMENTS

DE         112017000856  T5    11/2018
EP             3590749   A1     1/2020
JP            2015134534  A     7/2015

* cited by examiner

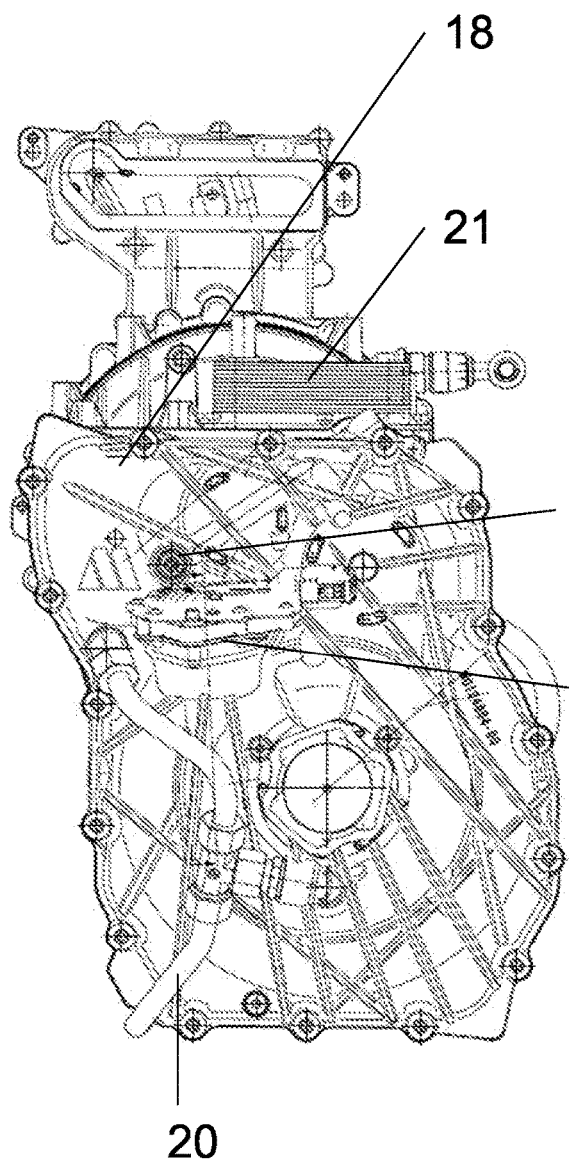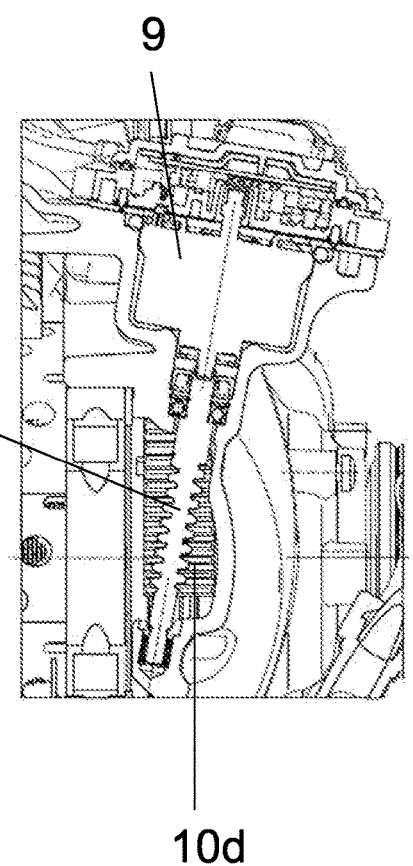
Fig. 3                    Fig. 4

DRIVE SYSTEM FOR AN ELECTRIC VEHICLE AND METHOD FOR OPERATING THE DRIVE SYSTEM

CROSS-REFERENCE TO RELATED APPLICATIONS

This patent application claims priority to German Patent Application Serial No. 102021200564.0 filed on Jan. 22, 2021, and German Patent Application Serial No. 102021200941.7, filed on Feb. 2, 2021. The entire disclosures of each of these applications is incorporated herein by reference.

FIELD OF THE INVENTION

The invention relates to a drive system for an electric vehicle with an electric machine, a transmission and two clutches which are arranged parallel to one another in a clutch pack.

Furthermore, the invention relates to a method for operating the drive system.

BACKGROUND

Vehicles are increasingly being converted to purely electric drive. Vehicles of this type will in future be equipped selectively with an open differential or what is known as a TWIN system with two clutches which in each case act on a half axle of the driven axle.

DE 11 2017 000 856 T5 has disclosed a solution with two electric machines and one differential.

DE 10 2007 008 946 B4 discloses a double clutch in a parallel, symmetrical overall design. The outer disk carriers are connected as torque outputs to the transmission input shafts, with the result that parts of an electric machine, for example a rotor, can be adapted at least on one of the outer disk carriers in order to produce a hybrid drive. In a case of this type, the stator of the electric machine is seated in a stationary manner in the transmission housing. The introduction of torque of the internal combustion engine takes place via a shaft into the main hub of the clutch.

For purely electric drive, twin and differential systems are to be capable of being provided with interfaces which are as far as possible identical, with the result that one vehicle platform can be provided with different modules.

In addition, electric drive systems are also to be capable of decoupling completely from the drive, in order thus to generate as little power loss as possible in certain operating states. The problem here in the case of double clutch systems is that the wet clutches which are used have a high drag torque in the open state as a result of the high number of disks. In addition, the clutches are used in a low rotational speed range, namely the wheel rotational speed, which provides a poor precondition in the case of ejecting of the oil.

Furthermore, the drive system is not to cause any splashing losses in the oil sump, specifically in the decoupled state.

In addition, a decoupled drive system should provide drive torque very rapidly again as required.

The safe state of the double clutch system (failsafe open) has to be ensured for both rotational directions. The forward direction is to be prioritized here.

It is an object of the invention to propose a drive device with a double clutch system, which drive device satisfies the requirements of a purely electric drive.

SUMMARY

The object is achieved by way of a drive system with an electric machine and two gear stages, formed by gearwheels and clutches, the rotor shaft of the electric machine defining an axial overall length, within which the predominant axial length component of an intermediate shaft which runs parallel to the former with gearwheels and an oil pump and the predominant axial length component of a split output shaft which runs parallel to the other shafts with two clutches run.

As a result of the three shafts which run in parallel and the mounting of the oil pump, the entire construction is possible in a highly compact manner completely within the overall length defined by the rotor.

It is also advantageous here that the axial extent of the two clutches runs within the overall length of the intermediate shaft with an oil pump.

In order to obtain rapidly opened clutches with a sufficiently small residual torque for the failsafe state, the clutches with the clutch actuation are of mirror-symmetrical construction in relation to a mirror plane.

The ball ramp is provided with two steps with two regions with a different gradient. As a result, both the air gap between the disks which is necessarily large for a small residual torque and rapid closure of the clutches in the case of re-engaging of the electric machine can be achieved.

The compact drive system comprises a common oil system for the electric machine and the clutches, with the oil pump, an oil tank and oil barriers, and inner bores in the housing (as an alternative, in combination with outer lines) for cooling and lubricating the components.

An important component is the oil barrier which, installed integrally in the rotating ball ramp part, closes and opens openings in the oil feed, fastened to the stationary ball ramp part, as a rotary slide.

Furthermore, the object is achieved by way of a method for operating the drive system for engaging the electric machine, the electric machine first of all being set to a target rotational speed and subsequently the clutches being closed and the oil supply being regulated parallel to this via the oil barriers.

In the case of disengaging of the electric machine, the two clutches are opened synchronously and the oil flow is stopped by way of the oil barriers, the rotational speed of the electric machine subsequently being increased, in order to eject oil from the clutches, and the oil pump emptying the oil sump.

DRAWINGS

Figure 2:
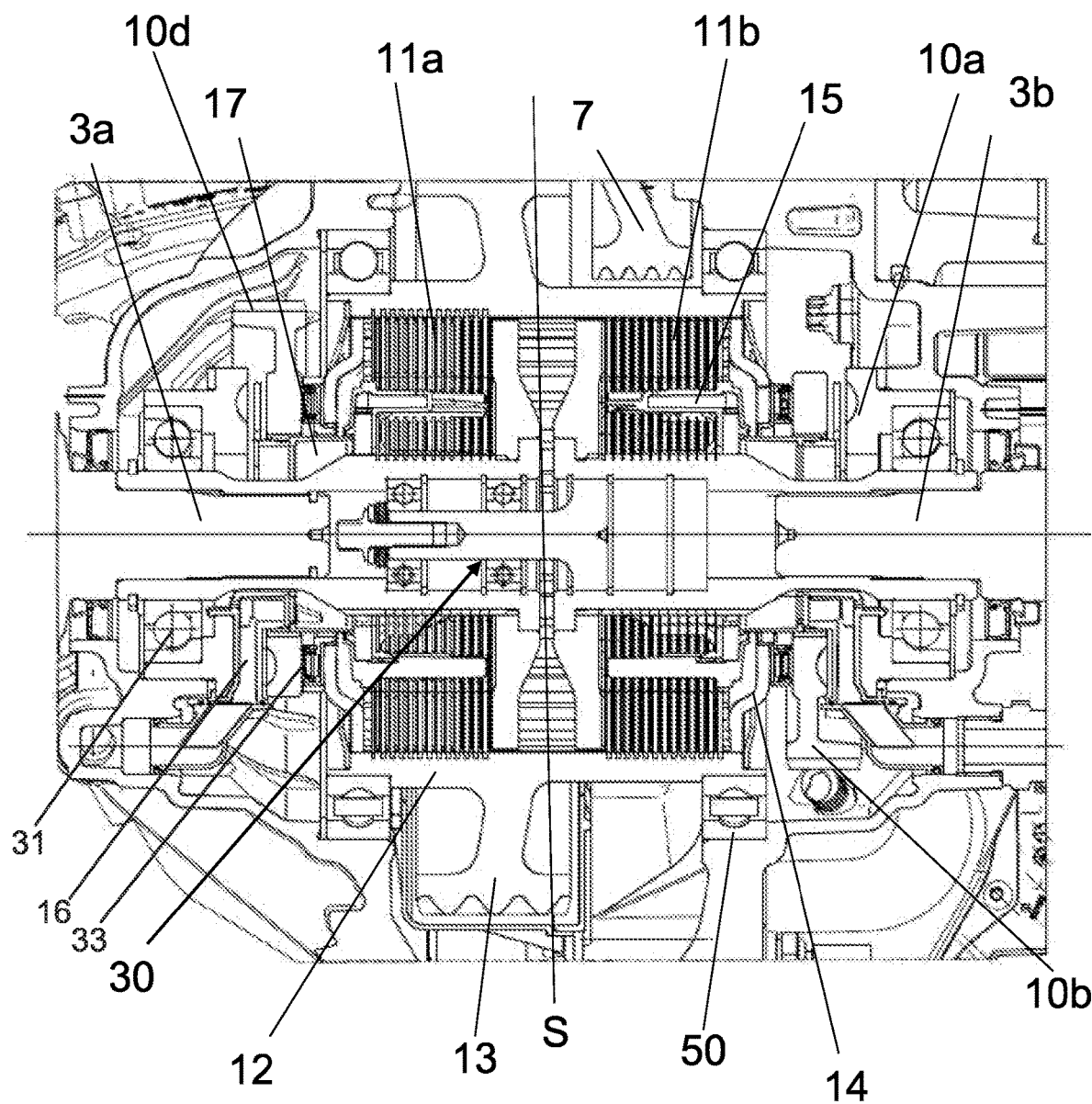
Figure 5:
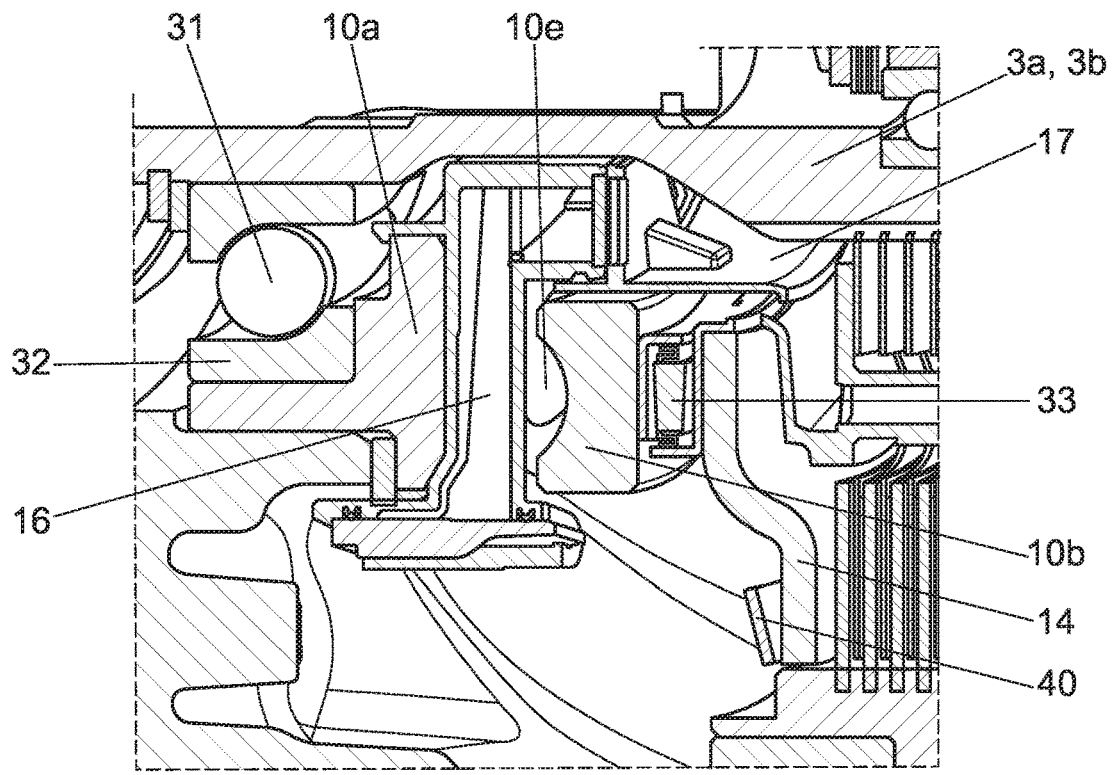
Figure 6:
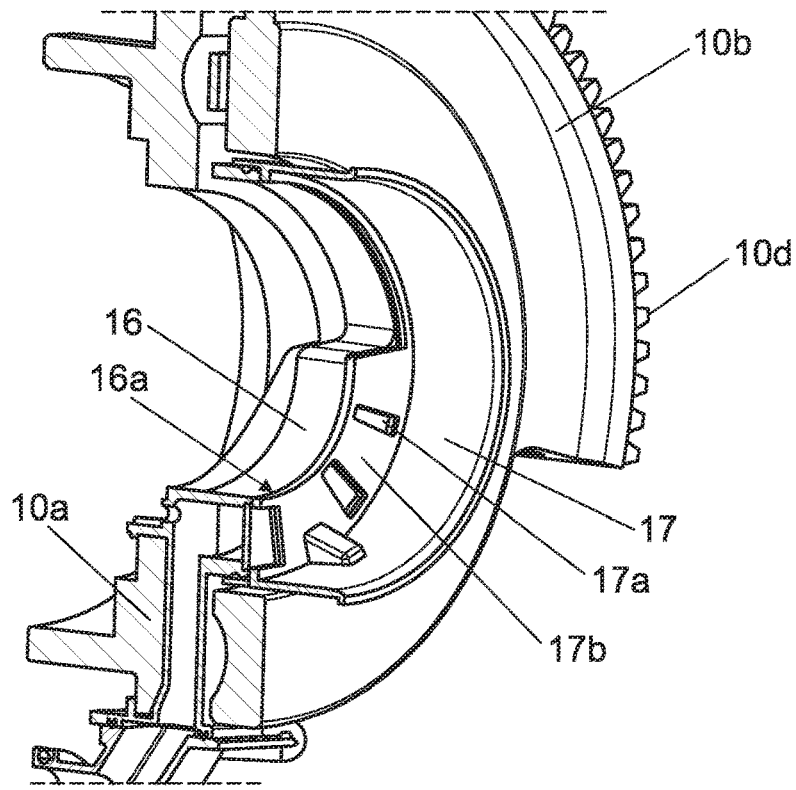

FIG. 1 shows a construction of an electric drive system,
FIG. 2 shows an enlargement of the region of the clutches,
FIG. 3 shows a top view of the electric drive system,
FIG. 4 shows a sectional view through an actuator,
FIG. 5 shows a section through a ball ramp construction,
FIG. 6 shows a view of an oil barrier.

DESCRIPTION

An electric drive system 1 is shown in FIG. 1. The drive system is dominated by an electric machine EM which comprises a rotor shaft 4 in a rotatable manner in a stator (not designated further). The rotor shaft 4 has an axial extent of 4L.

On its output side, the electric machine EM has a two-stage transmission G which is distinguished by a gearwheel 7 for the first gear stage and a gearwheel 8 for the second gear stage. The transmission G is mounted on an intermediate shaft 6 which is arranged parallel to the rotor shaft 4. Here, the intermediate shaft 6 lies below the rotor shaft 4 and extends at least partially in the axial extend 4L of the rotor shaft. The clutches 11a and 11b are arranged below the transmission G. Here, the clutches are coupled to drive half shafts 3a and 3b on the output side.

The drive half shafts 3a and 3b also run parallel to the rotor shaft 4 and the intermediate shaft 6, and lie below the intermediate shaft 6.

Furthermore, an oil pump 5 is mounted on the intermediate shaft 6. Said oil pump 5 is seated structurally below the rotor shaft 4 of the electric machine EM within the overall length 4L of the rotor shaft 4. The intermediate shaft 6 and the oil pump 5 extend over an overall length of 6L.

An actuator 9a is shown in a flange-connected manner, whereas the actuator 9b is merely indicated.

The two clutches 11a, 11b have a common clutch basket 12 which at the same time supports a drive wheel 13 of the second gear stage. Here, the drive wheel 13 is welded to the clutch basket 12. The drive wheel 13 is mounted in the housing 2 via deep groove ball bearings 50.

All the axles in the drive system 1 run parallel to one another. Here, more than 60% of the intermediate shaft 6 with the oil pump 5 which extends over a length 6L runs within the extent 4L of the rotor shaft 4 of the electric machine EM. The two clutches 11a and 11b lie completely within the extent 6L, the axial dimensions of the clutch basket 12 corresponding approximately to the length of the intermediate shaft 6. Therefore, the drive wheel 13 of the second gear stage lies completely below the intermediate shaft 6 within the extent 6L and partially below the rotor 4 within the extent 4L.

The clutches 11a, 11b are connected firstly to the clutch basket 12, which is linked to the drive wheel 13, and secondly to the drive half shafts 3a, 3b, and represent a hubless design for the drive system 1. A highly compact construction of the drive system 1 is possible by way of the arrangement.

The electric machine EM drives the clutch basket 12 via the two transmission stages with the gearwheel 7 driven by the rotor shaft 4 for establishing the first gear stage and the gearwheel 8 driving the drive wheel 13 for establishing the second gear stage.

The two clutches 11a and 11b are activated electromechanically via ball ramps 10. The latter are not configured as identical parts, in order to ensure a sufficiently satisfactory failsafe open function, but rather are of mirror-symmetrical configuration with respect to one another. The clutch ramps to the left and the right of the mirror plane S are therefore not configured with identical parts. As a result, it is possible that opening of the clutches is assisted in the case of the two clutches during forward travel.

Two independent actuators 9a, 9b operate the two clutches 11a, 11b.

The drive system 1 has a common oil system for the electric machine EM, the transmission G, and the clutches 11a and 11b. Said common oil system reduces the complexity of the construction and optimizes the thermal property of the system. Here, a coolant/lubricant has to be used which satisfies the requirement of the clutch for a constant coefficient of friction, the requirement of the electric machine EM with regard to the material compatibility of the machine parts, and the requirements of the bearings and toothing systems.

FIG. 2 shows the construction of the clutches 11a and 11b in detail. A pressure plate 14 is equipped with an integrated return spring 40. The ball ramp 10 is configured with two steps, in order to ensure the required air gaps even for the case of complete disengagement.

The disks of the clutches are provided with a corrugation. In order to open the clutch, a great spacing therefore has to be established between the disks. The clutch ramp has a first very steep course, with the result that a great stroke and therefore a great spacing between the disks can be established by way of a small rotary angle of the rotating ramp part 10b. The second region which serves to provide the clutch forces has a lower gradient which has to be actuated by way of a greater rotary angle of the rotating ramp part 10b with respect to the stationary ramp part 10a for high forces. The maximum possible rotary angle is limited geometrically, since three balls 10e are arranged in corresponding ramp grooves.

The ball ramp 10 consists of the stationary ramp part 10a and a rotating ramp part 10b, which is shown in detail in FIGS. 5 and 6.

An oil barrier 17 is clipped in the rotating ramp part 10b and utilizes the rotation of the two ball ramp parts with respect to one another in order to control the oil flow into the clutches 11a and 11b as required or, in the position of complete disengagement, to interrupt said oil flow completely. The oil barrier 17 is a cylindrical component which acts as a rotary slide. The cylindrical component is connected fixedly to the rotatable ball ramp 10b for conjoint rotation, and has a radially extending plane 17b. When the ball ramp 10b rotates, the cylindrical component rotates and, depending on the position of openings 17a in the plane 17b of the oil barrier 17, covers a plurality of openings 16a of a perforated plate in the stationary oil feed 16.

An angular contact ball bearing 31 is mounted in the stationary ramp part 10a. The outer ring 32 of the angular contact ball bearing 31 can also be integrated into the stationary ramp part 10a. Components can be saved as a result.

A worm toothing system 22 engages into the rotating ramp part 10b into the corresponding external toothing system 10d of the rotating ramp part 10b, to which the actuator 9 is coupled as drive, which is shown in FIG. 4.

In the case of forward travel, the rotatable ball ramps 10b are supported via the frictional torques on the axial bearings 33 of the clutch actuation in the case of the opening of the clutches.

Reaction forces which occur from the vehicle via the drive half shafts 3a, 3b are absorbed via the angular contact ball bearing 31 and the transmission housing 2. Highly precise guidance of the friction disks and a basic prestress for the actuation are ensured via a compact bearing arrangement 30 between the two drive half shafts 3a, 3b.

FIG. 3 shows the arrangement as a side view with an oil tank 18 which is installed in the interior and in which oil for the clutches 11a and 11b is buffer-stored and is fed as required via the oil barriers 17 to the clutches 11a, 11b.

The internal oil pump 5 is connected to the intermediate shaft 6 and firstly supplies the electric machine EM on the winding heads with cooling oil via the rotor shaft 4, in order to stabilize the electrical power. Secondly, the oil pump 5 also supplies the oil tank 18 with cooling oil via inner bores and an oil throttle 19. The heat in the oil is previously discharged by way of a water/oil heat exchanger 21 which is attached on the housing 2 above the oil tank 18.

The oil pump 5 serves to de-oil the oil sump of the drive system 1 and to convey the oil through the drive system. The oil volumetric flow of the mechanical oil pump 5 is divided into the volumetric flow for the electric machine EM, both for the rotor shaft 4 and for the winding head cooling, and into the volumetric flow for the clutches 11a, 11b.

In order to transfer the clutches into the completely open state, the drive system has to interact with switchable oil barriers, the oil tank, and. The actuation of the electric machine EM also has to be adapted.

In order to completely open the clutch, a procedure takes place which secures the open state and reaches it rapidly.

In the case of normal opening of the clutches, only an air play of from 1 to 1.5 mm arises. In order to open the clutch completely, the disks of the clutches have to be separated further from one another, in total approximately from 2 to 3 mm per clutch, and the oil has to be completely ejected, in order to avoid drag losses.

The procedure for opening the clutches begins with the request to the drive system to decouple the electric machine EM completely from the drive half shafts 3a, 3b.

Next, the two clutches 11a, 11b are opened synchronously. This takes place by way of the relief of the return spring 40 on the pressure plate 14, which leads to the oil barrier 17 on the rotating ramp part 10b interrupting the oil flow to the clutches completely by way of rotation of the two ball ramp parts with respect to one another. Here, the openings 16a of the oil feed 16 are covered completely by way of the regions between the openings 17a of the oil barrier 17.

Subsequently, by way of rotational-speed-regulated starting up of the electric machine EM, the oil sump of the drive system is sucked with the aid of the mechanical oil pump 5 which is coupled to the intermediate shaft 6 into the oil tank 18 which is configured as a deep tank, and the oil is ejected from the clutches 11a, 11b by way of the effect of the elevated rotational speed of the clutch basket 12.

This procedure step can be repeated as required if existing leaks of the oil supply mechanism refill the oil sump.

The following procedure is carried out in order to couple the electric machine EM to the drive train 1:

First of all, the rotational speed of the electric machine EM is powered up to the target rotational speed which corresponds approximately to the wheel rotational speed of the vehicle.

Subsequently, the clutches 11a, 11b are closed and therefore the release of the oil feed 16 is regulated via the oil barrier 17 in parallel. The regulated closure of the clutches when the electric machine EM and the wheel rotational speed are synchronous avoids negative influences on the longitudinal dynamics of the vehicle.

In the case of dynamic connecting operations, the rotational speed of the electric machine EM can also lie above the synchronous rotational speed before engagement, in order to generate an additional acceleration impulse by way of the mass inertia of the rotor of the electric machine.

LIST OF DESIGNATIONS

1 Drive system
2 Housing
3 Drive half shaft 3a, 3b
4 Rotor shaft
5 Oil pump
6 Intermediate shaft
7 First gear
8 Second gear
9 Actuator 9a, 9b
10 Ball ramp
10a Stationary ball ramp part
10b Rotating ball ramp part
10d External toothing system
10e Balls
11 Multiple disk clutch 11a, 11b
12 Clutch basket
13 Drive wheel
14 Pressure plate
15 Oil distributor, clutch
16 Oil feed
16a Openings, oil feed
17 Oil barrier
17a Openings, oil barrier
17b Axial plane
18 Oil tank
19 Oil throttle
20 Oil line
21 Heat exchanger
22 Worm shaft
30 Bearing arrangement
31 Angular contact ball bearing
32 Outer ring
33 Radial needle ball bearing
40 Return spring
50 Deep groove ball bearing

What is claimed is:

1. A drive system with an electric machine including a rotor shaft, a two-stage transmission having first and second gearwheels mounted to an intermediate shaft, an oil pump mounted to the intermediate shaft, and two clutches operably disposed between the transmission and a split output shaft, wherein the first gearwheel is driven by the rotor shaft and the second gearwheel drives a drive gear mounted to a common clutch basket of the two clutches, wherein the rotor shaft, the intermediate shaft and the split output shaft are aligned to be parallel to each other, wherein the rotor shaft defines an axial overall rotor shaft length, wherein a predominant component of an axial length of the intermediate shaft and the oil pump runs within the axial overall rotor shaft length, wherein a predominant component of an axial length of the split output shaft runs within the axial overall rotor shaft length, and wherein the drive wheel extends completely below the intermediate shaft within the axial overall length of the intermediate shaft and partially below the rotor shaft within the axial overal rotor shaft length.

2. The drive system as claimed in claim 1, wherein the clutches equipped with the clutch actuators are of mirror-symmetrical construction in relation to a mirror plane.

3. The drive system as claimed in claim 1, wherein there is a common oil system for the electric machine and the clutches with the oil pump including an oil tank and oil barriers, and inner bores or outer lines.

4. The drive system as claimed in claim 3, wherein the oil barrier closes and opens openings in a stationary oil feed as a rotary slide integrally in a rotating ball ramp part.

5. The drive system as claimed in claim 4, wherein the ball ramp is provided with a single step or with two steps with two regions with a different gradient.

6. The drive system as claimed in claim 1, wherein the clutches have corrugated or straight disks.

7. A method for operating the drive system as claimed in claim 1 for engaging the electric machine, the electric machine first being set to a target rotational speed and subsequently the clutches being closed and an oil supply being regulated via oil barriers.

8. A method for operating the drive system as claimed claim 1 in the case of disengaging of the electric machine, the two clutches being opened synchronously and oil flow being stopped by way of oil barriers, the rotational speed of the electric machine subsequently being increased, in order to eject oil from the clutches, and the oil pump emptying an oil sump.

9. A method for operating the drive system as claimed in claim 1, wherein the two clutches are open in a failsafe state.

10. The drive systems claimed in claim 1, wherein the drive connection between the rotor shaft and the first gearwheel defines a first stage of the two-stage transmission and the drive connection between the second gearwheel and the drive gear defines a second stage of the two-stage transmission.

11. The drive system as claimed in claim 1, wherein the two clutches are operably disposed between the common clutch basket and a corresponding portion of the split output shaft.

12. The drive system as claimed in claim 1, wherein a common oil system is used for cooling and lubricating the electric machine, the two-stage transmission and the clutches.

13. The drive system as claimed in claim 1, wherein an axial extent of the two clutches runs within the overall length of the intermediate shaft with the oil pump.

* * * * *